United States Patent
Takato

[11] Patent Number: 5,615,051
[45] Date of Patent: Mar. 25, 1997

[54] BRIGHT TRIPLET

[75] Inventor: Hideyasu Takato, Hachioji, Japan

[73] Assignee: Olympus Optical Co., Ltd., Tokyo, Japan

[21] Appl. No.: 319,603

[22] Filed: Oct. 7, 1994

[30] Foreign Application Priority Data

Oct. 8, 1993 [JP] Japan .................................... 5-253062

[51] Int. Cl.$^6$ .................................................. G02B 9/14
[52] U.S. Cl. ......................................... 359/790; 359/716
[58] Field of Search ........................... 359/790, 716, 359/784, 785

[56] References Cited

U.S. PATENT DOCUMENTS

| | | | |
|---|---|---|---|
| 3,967,884 | 7/1976 | De Jager | 359/790 |
| 4,542,961 | 9/1985 | Sato | 359/790 |
| 4,787,724 | 11/1988 | Kudo et al. | 359/790 |

FOREIGN PATENT DOCUMENTS

| | | |
|---|---|---|
| 59-34610 | 2/1984 | Japan . |
| 59-160120 | 9/1984 | Japan . |
| 59-160119 | 9/1984 | Japan . |
| 62-183420 | 8/1987 | Japan . |
| 63-96620 | 4/1988 | Japan . |
| 1134412 | 5/1989 | Japan . |
| 1133016 | 5/1989 | Japan . |
| 1261612 | 10/1989 | Japan . |
| 1261613 | 10/1989 | Japan . |
| 476510 | 3/1992 | Japan . |
| 497111 | 3/1992 | Japan . |
| 5934510 | 2/1994 | Japan . |

OTHER PUBLICATIONS

JP Patent Abstract—4–9711—Mar. 1992.
JP Patent Abstract—4–76510—Mar. 1992.
JP Patent Abstract—1–261613—Oct. 1989.
JP Patent Abstract—1–134412—May 1989.
JP Patent Abstract—1–133016—May 1989.
JP Patent Abstract—62–183420—Aug. 1987.
JP Patent Abstract—59–34510—Feb. 1984.
JP Patent Abstract—63–96620—Apr. 1988.

*Primary Examiner*—Scott J. Sugarman
*Attorney, Agent, or Firm*—Cushman, Darby & Cushman IP Group of Pillsbury Maidson & Sutro LLP

[57] ABSTRACT

The invention provides a high-performance, bright and compact triplet that has a zoom ratio of about 1.05 with an wide field angle, said triplet comprising, in order from the object side, a first lens L1 consisting of a positive single lens of glass in a meniscus form convex on the object side, a second lens L2 located with an air separation between it and said first lens L1 and consisting of a negative single lens of glass, a third lens L3 located with an air separation between it and said second lens L2 and consisting of a positive single lens of glass in a double-convex form, and an aperture stop S located on the image side of said third lens, at least two of said first to third lenses having aspherical surfaces, and conforming to the following conditions $n_1>1.6$, $n_3>1.6$ wherein $n_1$ and $n_3$ are the refractive indices of said first and third lenses, respectively.

22 Claims, 4 Drawing Sheets

BRIGHT TRIPLET

BACKGROUND OF THE INVENTION

The present invention relates to a bright triplet and, more particularly, to a behind-the-stop type triplet that has a wide field angle and is bright, so that it is well suited for use on photographic cameras.

So far, triplets have been used on many lens shutter cameras for the reasons that they can achieve relatively good optical performance with fewer lenses, and can be easily made compact.

Among these triplets, many proposals have been made of a behind-the-stop type wherein a stop is located behind a lens system, because its lens barrel is simple in construction and it is advantageous for drawing-out and exposure control.

However, since triplets have a limited degree of freedom because of being made up of fewer lenses, some inherent limitation is imposed on the achievement of wide-angle, bright and compact yet high-performance photographic lenses only by use of spherical lens elements. For this reason and to achieve such photographic lenses, many triplets having aspherical configurations have been proposed in the art. Of these, triplets including at least two aspherical lens elements, each made up of plastics, are set forth in JP-A 4-97111, JP-A 4-76510, JP-A 1-261613, JP-A 1-134412, JP-A 1-133016 and JP-A 62(1987)-183420. However, it is hard to say that all the triplets put forward by these patent specifications provide lenses having good-enough optical performance, because of being made up of plastic lenses. In particular, most of the lenses have an F-number of the order of 3.5 to 5; no bright lenses are obtained. Of these specifications, JP-A 62-183420 puts forward a triplet that is bright, as expressed by an F-number of about 2.8. However, this is still less than satisfactory in terms of correction for aberrations because there is chromatic aberration with no correction for coma. Thus, by use of plastic lenses it is impossible to achieve bright yet high-performance triplets.

Triplets comprising aspherical surfaces formed by using glass as vitreous material have been proposed in the art, as set forth in JP-A 59(1984)-34510, JP-A 59-160119, JP-A 59-160120 and JP-A 63(1988)-96620. The photographic lenses proposed by the publications mentioned above all use aspherical lenses formed by using glass as vitreous material, thereby maintaining good optical performance, while they are relatively bright and compact with a wide field angle.

Moreover, there are photographic lenses having aspherical configuration on both their lens surfaces so as to achieve better optical performance, as again set forth in JP-A 59-34510, JP-A 59-160119 and JP-A 59-160120.

However, these photographic lenses fail to provide a lens system which is brighter than expressed in terms of an F-number of about 3.5, as contemplated by the present invention.

SUMMARY OF THE INVENTION

In view of such problems as mentioned above, an object of the present invention is to provide a bright and compact yet high-performance triplet that has a zoom ratio of about 1.05 with a wide field angle.

According to one aspect of the invention, there is provided a bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, and in which at least two of said first to third lenses are provided with aspherical surfaces.

According to another aspect of the invention, there is provided a bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, at least two of said first to third lenses being provided with aspherical surfaces, and which conforms to the following conditions:

$$n_1 > 1.6, \, n_3 > 1.6 \tag{7}$$

wherein $n_1$ and $n_3$ are the refractive indices of said first and third lenses, respectively.

In the ensuing description, reference will now be made to why the lens arrangement mentioned above is used in the invention and how it acts.

In the case of a triplet as bright as expressed by an F-number of about 2.8, it is generally noted that because the height of the marginal ray above the axis becomes large, the rays passing through the circumferential portion of the triplet are so strongly bent that much spherical aberration occurs. To add to this, when the triplet is made compact by reducing its overall length, the refracting powers of the respective lenses become so strong that the Petzval sum becomes large. This in turn causes the astigmatism to become worse with the occurrence of coma, resulting in some considerable degradation of the performance in the vicinity of the image plane.

An aspherical lens, because of having large action on its circumferential portion, works well for corrections for axial marginal rays and off-axis rays, both having large heights. However, only by use of one aspherical lens it is difficult to focus all marginal and off-axis rays into a good image, because some limitation is on the ability of the aspherical lens to correct aberrations. By use of two or more aspherical lenses according to the invention it is possible to give rise to some remarkable increase in the ability of the triplet to correct aberrations, thereby providing a solution to such problems as already mentioned and so achieving a triplet system having substantially flat performance from the center to the circumference of the image plane.

In accordance with the invention, aspherical surfaces are applied to one sides of two or more lenses. A conventional triplet with aspherical surfaces applied to both sides of one lens is less effective for correcting aberrations, because the abilities of both sides to correct aberrations are substantially on the same level. According to the invention where aspherical surfaces are applied to one sides of two or more lenses, it is possible to achieve more effective correction for coma and spherical aberration. Moreover, a lens with an aspherical surface on one side has a great advantage in view of lens fabrication, because centering can be easily done.

In the present invention, it is then preferable that when letting x denote the difference between the aspherical and spherical configurations at an effective maximum diameter, the magnitude of asphericity of all the aspherical surfaces conforms to the following condition (1):

$$1\times10^{-4} < |x/f| < 1\times10^{-2} \tag{1}$$

where f is the focal length of the overall system.

If the magnitude of asphericity of each surface comes within the range defined by Cond. (1), the effect of the aspherical surface can then reach a maximum; the spherical aberration and coma can be well corrected by conforming to Cond. (1). This condition is especially effective for achieving a brightness as expressed by an F-number of about 2.8, because the coma cannot possibly be corrected only by use of spherical lenses. Thus, unless Cond. (1) is satisfied, it will then be difficult to make well correction for coma; if the lower limit $1\times10^{-4}$ of Cond. (1) is not reached, the coma will be under-corrected, whereas if the upper limit $1\times10^{-2}$ of Cond. (1) is exceeded, higher-order aberrations will occur. If the lower limit of Cond. (1) is not reached, the spherical aberration will again be under-corrected.

In addition, aberrations may be well corrected by conforming to any one of the following conditional formulae (2) to (6).

Conditional formulae (2) to (4) are provided to determine the refracting power of each lens. By conforming to these conditional formulae it is possible to properly determine the refracting power of each lens, so that the Petzval sum can be reduced so as to keep the image surface in good condition.

$$0.4 < f_1/f < 0.7 \tag{2}$$

where $f_1$ is the focal length of the first lens.

Conditional formula (2) is effective for correction for spherical aberration. Unless the lower limit 0.4 of Cond. (2) is reached, the spherical aberration will be under-corrected, whereas if the upper limit 0.7 of Cond. (2) is exceeded, the spherical aberration will be over-corrected.

$$-0.5 < f_2/f < -0.3 \tag{3}$$

where $f_2$ is the focal length of the second lens.

Conditional formula (3) is provided to correct axial chromatic aberration and chromatic aberration of magnification in a well-balanced state. Unless the lower limit −0.5 of Cond. (3) is reached, the axial chromatic aberration will be under-corrected with over-correction for the chromatic aberration of magnification, whereas if the upper limit −0.3 is exceeded, the reverse will be true; that is, the chromatic aberration of magnification will be under-corrected with over-correction for the axial chromatic aberration.

$$0.4 < f_3/f < 0.85 \tag{4}$$

where $f_3$ is the focal length of the third lens.

Conditional formula (4) is provided to make well correction for astigmatism and coma. If the upper limit 0.85 of Cond. (4) is exceeded, the bending of the coma will become large, whereas unless the lower limit 0.4 is reached, the astigmatic difference will become large.

$$0.6 < r_5/f < 4 \tag{5}$$

where $r_5$ is the radius of curvature on the incident side of the third lens.

Conditional formula (5) is provided to determine the radius of curvature of the object-side surface of the third lens, and to make the lens system compact as well. If the upper limit 4 of Cond. (5) is not reached, it is then possible to reduce the length of the lens system due to a reduction in the back focus, because some refracting power can be imparted to the third lens. Unless the lower limit 0.6 is reached, spherical aberration and coma will occur due to the strong bending of the ray by this surface.

$$0.03 < d_4/f < 0.08 \tag{6}$$

where $d_4$ is the air separation between the second and third lenses.

Conditional formula (6) relates to the air separation between the second and third lenses. If the air separation lies within the range defined by this formula, it is then possible for the distortion to have a proper value. However, unless the lower limit of 0.03 is reached, the distortion will be under-corrected, whereas if the upper limit of 0.08 is exceeded, the astigmatism and coma will become worse as in the case of Cond. (4) mentioned above.

In the present invention, it is desired that the refractive indices of the first and third lenses conform to the following conditions (7), preferably (8):

$$n_1 > 1.6, n_3 > 1.6 \tag{7}$$

$$n_1 > 1.7, n_3 > 1.7 \tag{8}$$

where $n_1$ and $n_3$ are the refractive indices of the first and third lenses, respectively.

By conforming to Cond. (7) or (8) it is possible to reduce the Petzval sum and, hence, keep the image surface in good condition. A lens, for which brightness is especially needed, is designed to have a large radius of curvature so as to focus the rays passing through the circumference of the lens into a good image, so that aberrations are likely to occur. However, by a choice of vitreous material conforming to these conditional formulae it is possible for each lens to have a proper refracting power even when the lens has a small radius of curvature, thereby achieving a bright yet high-performance triplet.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following description, reference will be made to Examples 1 to 5 of the triplet according to the invention.

Figure 1:
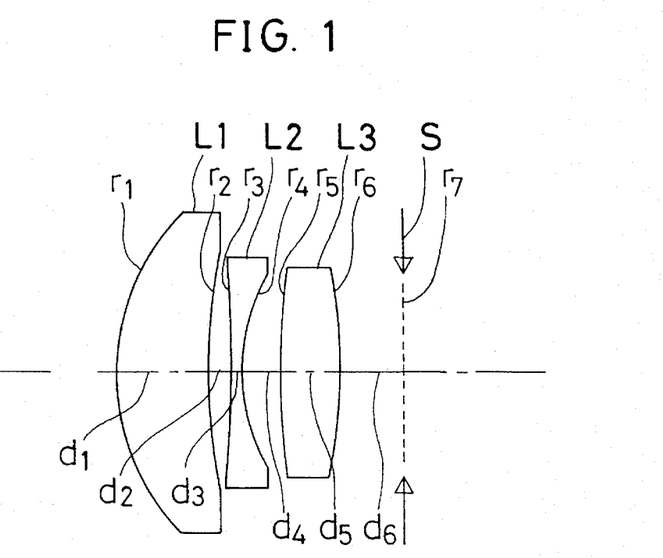
FIG. 1 is a sectional view of Example 1 of the bright triplet according to the invention.

Presented in FIG. 1 is a sectional view of the lens system of Example 1. It is here to be noted that Examples 2 to 5 are not illustrated due to substantial similarity to Example 1. In order from the object side, the first lens L1 consists of a positive meniscus lens convex on the object side in all examples; the second lens L2 consists of a double-concave lens in Examples 1, 3 and 4 and a negative meniscus lens convex on the object side in Examples 2 and 5; and the third lens L3 consists of a double-convex lens in all examples, with a stop S located on the image side thereof.

Ashperical surfaces will now be explained. In Example 1 two are used for the object-side surface of the first lens L1 and the image-side surface of the second lens L2; in Example 2 two are used for the image-side surface of the first lens L1 and the object-side surface of the third lens L3; in Example 3 two are used for the object-side surface of the first lens L1 and the image-side surface of the third lens L3; in Example 4 two are used for the image-side surface of the second lens L2 and the image-side surface of the third lens L3; and in Example 5 three are used for the object-side surface of the first lens L1, the image-side surface of the second lens L2 and the image-side surface of the third lens L3.

Set out below are the lens data in each example. Symbols used hereinafter but not hereinbefore have the following means:

f is the focal length of the overall system, F the F-number, $2\omega$ the field angle, $f_B$ the back focus, $r_1, r_2 \ldots$ the radii of curvature of the lens surfaces, $d_1, d_2 \ldots$ the separations between adjacent lens surfaces, $n_{d1}, n_{d2} \ldots$ the d-line indices of refraction of the lenses, and $v_{d1}, v_{d2} \ldots$ the Abbe's numbers of the lenses. Now let X denote the direction of the optical axis along which light propagates and Y stands for the direction perpendicular to the optical axis. Then, the aspherical configuration is given by $$X=(Y^2/r)/[1+\{1-(Y/r)^2\}^{1/2}]+A_4Y^4+A_6Y^6+A_8Y^8+A_{10}Y^{10}$$

where r is the paraxial radius of curvature and $A_4, A_6, A_8$ and $A_{10}$ are the aspherical coefficients.

Example 1
f = 100, F = 2.75, 2ω = 64.1°, $f_B$ = 75.681

| | | | | | | | |
|---|---|---|---|---|---|---|---|
| $r_1$ = | 32.095 (Aspheric) | $d_1$ = | 11.18 | $n_{d1}$ = | 1.734 | $v_{d1}$ = | 51.49 |
| $r_2$ = | 101.134 | $d_2$ = | 3.97 | | | | |
| $r_4$ = | −104.475 | $d_3$ = | 2.34 | $n_{d2}$ = | 1.689 | $v_{d2}$ = | 31.08 |
| $r_4$ = | 29.779 (Aspheric) | $d_4$ = | 4.03 | | | | |
| $r_5$ = | 80.680 | $d_5$ = | 8.31 | $n_{d3}$ = | 1.799 | $v_{d3}$ = | 42.24 |
| $r_6$ = | −74.724 | $d_6$ = | 3.19 | | | | |
| $r_7$ = | ∞ (Stop) | | | | | | |

Aspherical Coefficients

1st surface $A_4$ = −0.36605 × $10^{-6}$
$A_6$ = 0.83626 × $10^{-9}$
$A_8$ = −0.47666 × $10^{-11}$
$A_{10}$ = 0.98514 × $10^{-14}$
|x/f| = 2.57 × $10^{-4}$ 4th surface $A_4$ = −0.22066 × $10^{-5}$
$A_6$ = −0.3244 × $10^{-8}$
$A_8$ = 0.4598 × $10^{-11}$
$A_{10}$ = 0
|x/f| = 1.18 × $10^{-3}$ Example 2
f = 100, F = 2.9, 2ω = 61.2°, $f_B$ = 70.738

| | | | | | | | |
|---|---|---|---|---|---|---|---|
| $r_1$ = | 29.673 | $d_1$ = | 10.80 | $n_{d1}$ = | 1.729 | $v_{d1}$ = | 54.68 |
| $r_2$ = | 137.069 (Aspheric) | $d_2$ = | 3.37 | | | | |
| $r_3$ = | 539.632 | $d_3$ = | 2.26 | $n_{d2}$ = | 1.688 | $v_{d2}$ = | 31.08 |
| $r_4$ = | 24.365 | $d_4$ = | 7.47 | | | | |
| $r_5$ = | 156.184 (Aspheric) | $d_5$ = | 6.71 | $n_{d3}$ = | 1.806 | $v_{d2}$ = | 40.95 |
| $r_6$ = | −94.716 | $d_6$ = | 3.08 | | | | |
| $r_7$ = | ∞(stop) | | | | | | |

Aspherical Coefficients

2nd surface $A_4$ = 0.37324 × $10^{-5}$
$A_6$ = −0.41589 × $10^{-8}$
$A_8$ = 0.76349 × $10^{-11}$
$A_{10}$ = −0.47762 × $10^{-14}$
|x/f| = 3.57 × $10^{-3}$ 5th surface $A_4$ = 0.34557 × $10^{-5}$
$A_6$ = −0.4088 × $10^{-8}$
$A_8$ = 0.27779 × $10^{-10}$
$A_{10}$ = −0.55337 × $10^{-13}$
|x/f| = 9.71 × $10^{-4}$ Example 3
f = 100, F = 2.8, 2ω = 63.6°, $f_B$ = 74.245

| | | | | | | | |
|---|---|---|---|---|---|---|---|
| $r_1$ = | 31.174 (Aspheric) | $d_1$ = | 10.92 | $n_{d1}$ = | 1.729 | $v_{d1}$ = | 54.68 |
| $r_2$ = | 94.957 | $d_2$ = | 4.13 | | | | |
| $r_3$ = | −149.133 | $d_3$ = | 2.34 | $n_{d2}$ = | 1.688 | $v_{d2}$ = | 31.08 |
| $r_4$ = | 28.430 | $d_4$ = | 3.72 | | | | |
| $r_5$ = | 90.539 | $d_5$ = | 9.24 | $n_{d3}$ = | 1.835 | $v_{d3}$ = | 42.72 |
| $r_6$ = | −80.165 (Aspheric) | $d_6$ = | 3.19 | | | | |
| $r_7$ = | ∞ (Stop) | | | | | | |

Aspherical Coefficients

1st surface $A_4$ = −0.44774 × $10^{-6}$
$A_6$ = 0.83567 × $10^{-10}$
$A_8$ = −0.70375 × $10^{-12}$
$A_{10}$ = 0
|x/f| = 7.34 × $10^{-4}$ 6th surface $A_4$ = −0.1887 × $10^{-5}$
$A_6$ = 0.1435 × $10^{-8}$
$A_8$ = −0.93183 × $10^{-11}$
$A_{10}$ = 0
|x/f| = 7.34 × $10^{-4}$ Example 4
f = 100, F = 2.85, 2ω = 62.4°, $f_B$ = 70.508

| | | | | | | | |
|---|---|---|---|---|---|---|---|
| $r_1$ = | 29.380 | $d_1$ = | 10.46 | $n_{d1}$ = | 1.729 | $v_{d1}$ = | 54.68 |
| $r_2$ = | 107.213 | $d_2$ = | 3.82 | | | | |
| $r_3$ = | −934.888 | $d_3$ = | 2.29 | $n_{d2}$ = | 1.688 | $v_{d2}$ = | 31.08 |
| $r_4$ = | 27.593 | $d_4$ = | 6.83 | | | | |

-continued

| | (Aspheric) | | | |
|---|---|---|---|---|
| $r_5 =$ | 154.353 | $d_5 =$ 8.74 | $n_{d3} = 1.834$ | $v_{d3} = 42.72$ |
| $r_6 =$ | −98.617 | $d_6 =$ 3.12 | | |
| | (Aspheric) | | | |
| $r_7 =$ | ∞ (Stop) | | | |

Aspherical Coefficients

4th surface $A_4 =$    $0.41536 \times 10^{-5}$
$A_6 =$    $0.5614 \times 10^{-8}$
$A_8 =$    $-0.48807 \times 10^{-11}$
$A_{10} =$    0
$|x/f| = 1.6 \times 10^{-3}$ 6th surface $A_4 =$    $-0.19779 \times 10^{-5}$
$A_6 =$    $0.98637 \times 10^{-9}$
$A_{10} =$    $0.54615 \times 10^{-12}$
$A_{10} =$    0
$|x/f| = 5.79 \times 10^{-4}$ Example 5
$f = 100$, $F = 2.85$, $2\omega = 62.8°$, $f_B = 71.451$

| | | | | |
|---|---|---|---|---|
| $r_1 =$ | 27.616 | $d_1 =$ 12.11 | $n_d = 1.729$ | $v_d = 54.68$ |
| | (Aspheric) | | | |
| $r_2 =$ | 69.08 | $d_2 =$ 2.19 | | |
| $r_3 =$ | 1675.485 | $d_3 =$ 2.3 | $n_d = 1.688$ | $v_d = 31.08$ |
| $r_4 =$ | 28.218 | $d_4 =$ 5.3 | | |
| | (Aspheric) | | | |
| $r_5 =$ | 389.194 | $d_5 =$ 9 | $n_d = 1.834$ | $v_d = 42.72$ |
| $r_6 =$ | −72.298 | $d6 =$ 3.13 | | |
| | (Aspheric) | | | |
| $r_7 =$ | ∞ (Stop) | | | |

Aspherical Coefficients

Figure 2A:
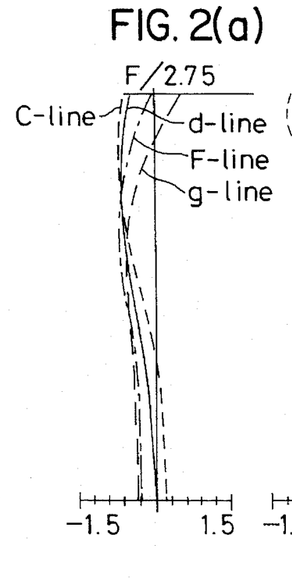
FIGS. 2(a)–2(d) are aberration diagrams showing the spherical aberration, astigmatism, distortion, and chromatic aberration of magnification of Example 1 according to the invention.
Figures 2B, 2C:
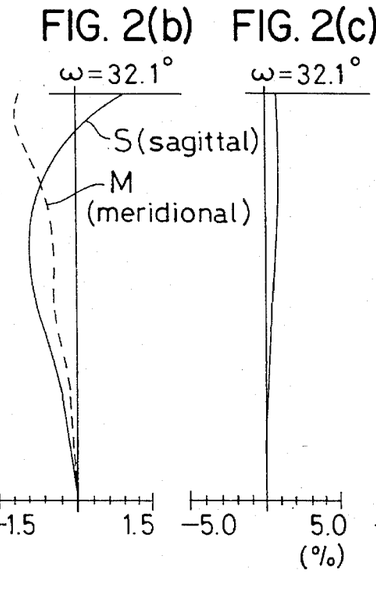
Figure 2D:
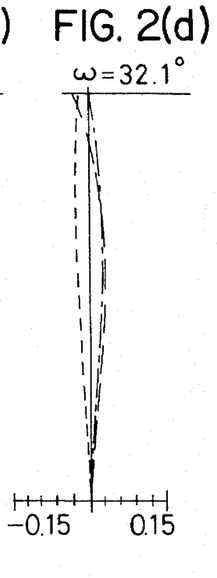
Figure 3A:
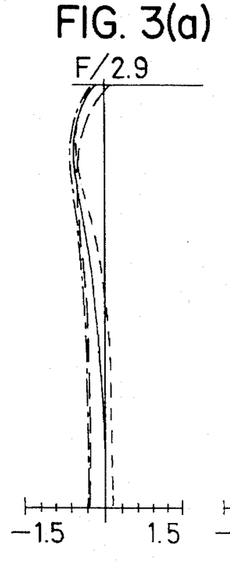
FIGS. 3(a)–3(d) are aberration diagrams of Example 2 according to the invention, which are similar to FIGS. 2(a)–2(d), FIGS. 4(a)–4(d) are aberration diagrams of Example 3 according to the invention, which are similar to FIGS. 2(a)–2(d), FIGS. 5(a)–5(d) of Example 4 according to the invention, which are similar to FIGS. 2(a)–2(d), FIGS. 6(a)–6(d) of Example 5 according to the invention, which are similar to FIGS. 2(a)–2(d)
Figures 3B, 3C, 3D:
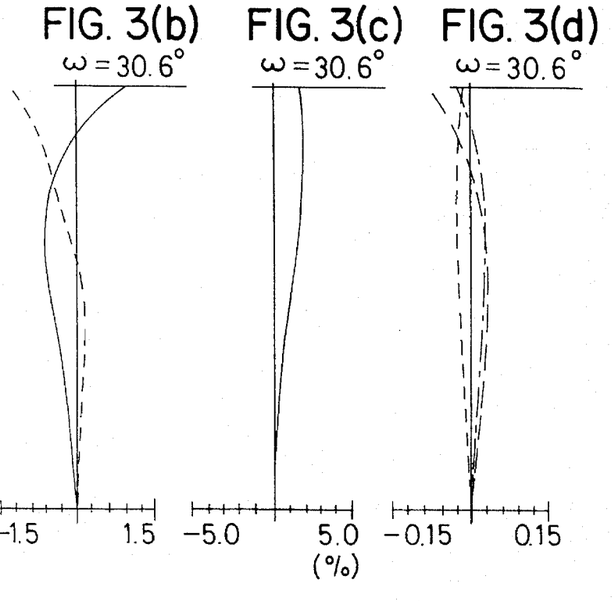
Figure 4A:
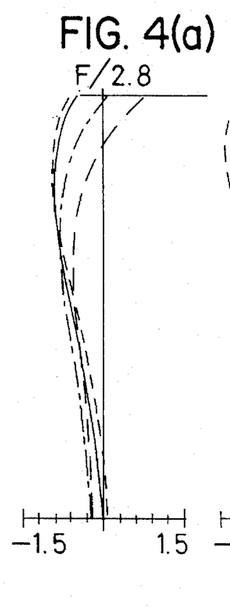
Figures 4B, 4C, 4D:
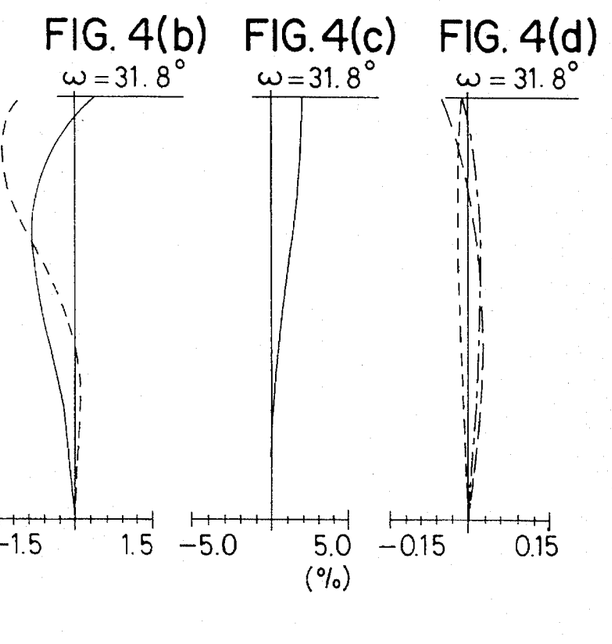
Figure 5A:
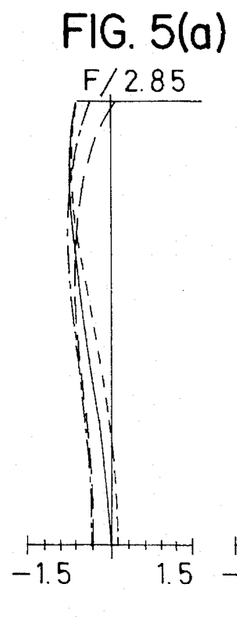
Figures 5B, 5C, 5D:
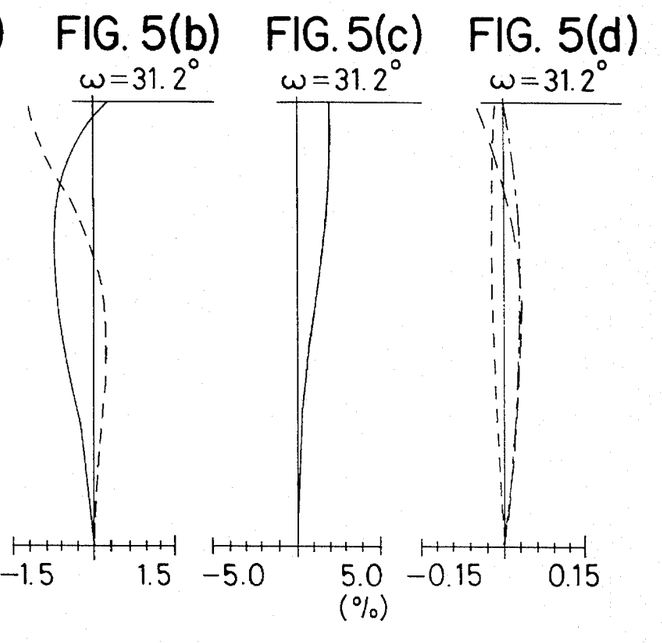
Figure 6A:
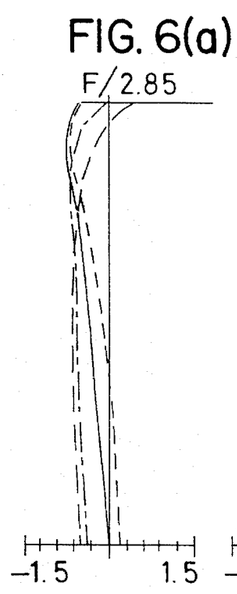
Figures 6B, 6C, 6D:
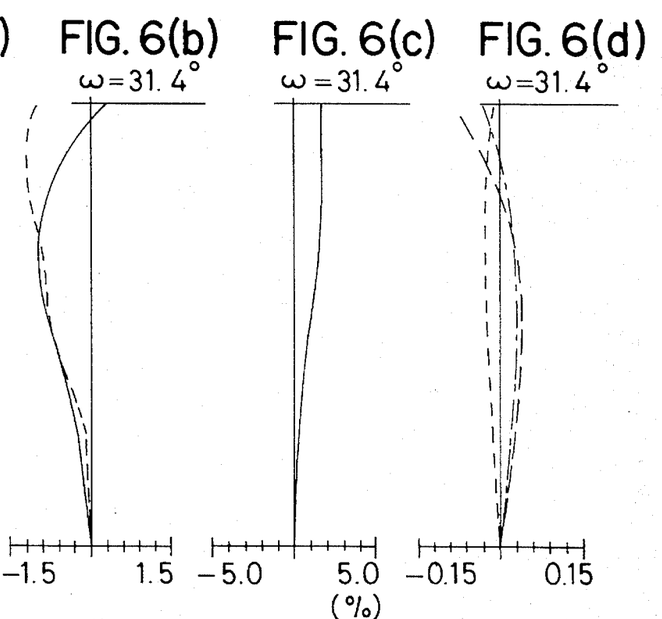

1st surface $A_4 =$    $0.55185 \times 10^{-6}$
$A_6 =$    $0.36336 \times 10^{-8}$
$A_8 =$    $-0.54247 \times 10^{-11}$
$A_{10} =$    $0.15291 \times 10^{-13}$
$|x/f| = 5.24 \times 10^{-3}$ 4th surface $A_4 =$    $0.91622 \times 10^{-5}$
$A_6 =$    $0.44869 \times 10^{-7}$
$A_8 =$    $-0.12925 \times 10^{-9}$
$A_{10} =$    $0.51103 \times 10^{-12}$
$|x/f| = 5.22 \times 10^{-3}$ 6th surface $A_4 =$    $-0.27618 \times 10^{-5}$
$A_6 =$    $-0.91445 \times 10^{-8}$
$A_8 =$    $0.18166 \times 10^{-10}$
$A_{10} =$    $-0.10975 \times 10^{-12}$
$|x/f| = 1.54 \times 10^{-3}$ Presented in FIGS. 2 t(a)–6(d) are the aberration diagrams showing the spherical aberrations (a), astigmatisms (b), distortions (c), and chromatic aberrations of magnification (d) in Examples 1 to 5 mentioned above. Also set out below are the values for Conditions (2) to (6) in the examples referred to above.

| | Cond. | Ex. 1 | Ex. 2 | Ex. 3 | Ex. 4 | Ex. 5 |
|---|---|---|---|---|---|---|
| (2) | $f_1/f$ | 0.599 | 0.498 | 0.594 | 0.525 | 0.562 |
| (3) | $f_2/f$ | −0.334 | −0.371 | −0.345 | −0.389 | −0.417 |
| (4) | $f_3/f$ | 0.497 | 0.74 | 0.522 | 0.732 | 0.737 |
| (5) | $r_5/f$ | 0.806 | 1.561 | 0.905 | 1.543 | 3.892 |
| (6) | $d_4/f$ | 0.04 | 0.074 | 0.037 | 0.068 | 0.053 |

Figure 7:
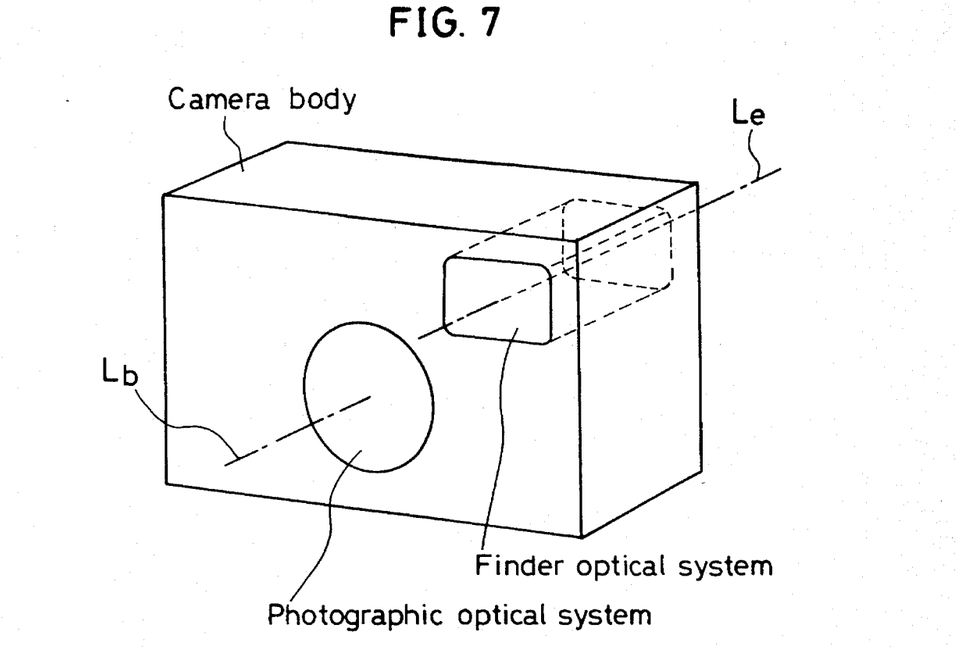
FIG. 7 is a perspective view of the construction of a compact camera.
Figure 8:
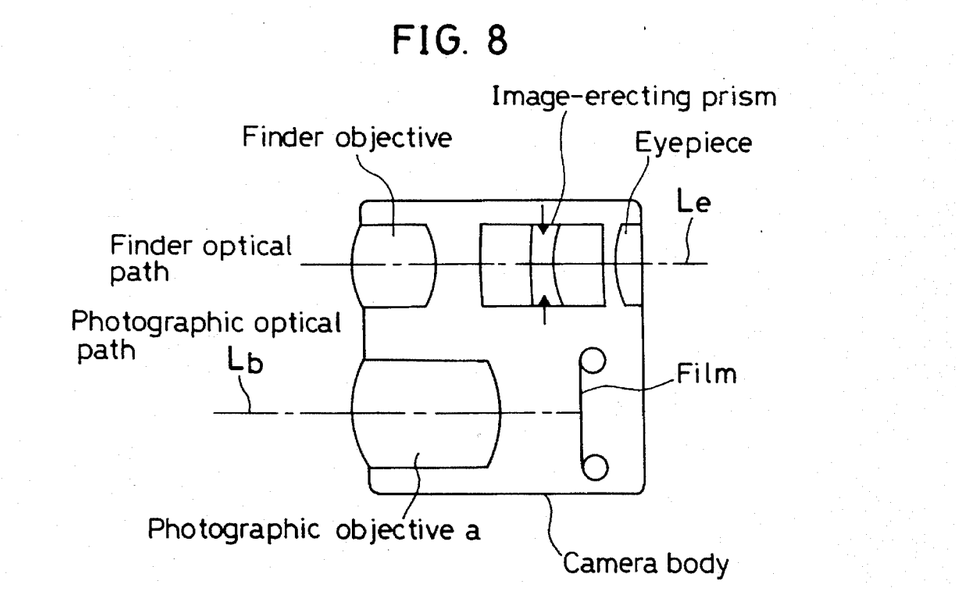
FIG. 8 is a sectional view of the construction of a compact camera.

The inventive triplet as explained above, for instance, is used as a photographic objective a for a compact camera the perspective and sectional views of which are presented in FIGS. 7 and 8. It is here to be understood that Lb and Le stand for a photographic optical path and a finder optical path, respectively. The photographic and finder optical paths Lb and Le are arranged in parallel with each other, and the image of a subject is viewed through a finder built up of a finder objective, an image erecting prism and an eyepiece, and focused through the objective a onto film.

As will be understood from what has been explained, the triplet according to the invention comprises lenses, all made up of glass, and two or more aspherical surfaces, and thereby provides a bright yet high-performance lens system.

What I claim is:

1. A bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, and in which at least said first and said third lenses are provided with aspherical surfaces.

2. A bright triplet as claimed in claim 1, which satisfies the following condition (8):

$$n_1 > 1.7, n_3 > 1.7 \quad (8)$$

wherein $n_1$ and $n_3$ are the refractive indices of said first and third lenses, respectively.

3. A bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, at least said first and said third lenses being provided with aspherical surfaces, and which conforms to the following conditions:

$$n_1 > 1.6, n_3 > 1.6 \quad (7)$$

wherein $n_1$ and $n_3$ are the refractive indices of said first and third lenses, respectively.

4. A bright triplet as claimed in claim 1 or 1, which satisfies the following condition (1):

$$1 \times 10^{-4} < x/f < 1 \times 10^{-2} \quad (1)$$

where x is the difference between the aspherical and spherical configurations at the effective maximum diameters of said aspherical surfaces, and f is the focal length of the overall system.

5. A bright triplet as claimed in claim 1 or 3, which satisfies the following condition (2):

$$0.4 < f_1/f < 0.7 \quad (2)$$

where f is the focal length of the overall system and $f_1$ is the focal length of said first lens.

6. A bright triplet as claimed in claim 1 or 3, which satisfies the following condition (3):

$$0.5 < f_2/f < -0.3 \quad (3)$$

where f is the local length of the overall system and $f_2$ is the focal length of said second lens.

7. A bright triplet as claimed in claim 1 or 3, which satisfies the following condition (4):

$$0.4 < f_3/f < 0.85 \qquad (4)$$

where f is the focal length of the overall system and $f_3$ is the focal length of said third lens.

8. A bright triplet as claimed in claim 1 or 3, which satisfies the following condition (5):

$$0.6 < r_5/f < 4 \qquad (5)$$

where f is the focal length of the overall system and $r_5$ is the radius of curvature on the incident side of said third lens.

9. A bright triplet as claimed in claim 1 or 3, which satisfies the following condition (6):

$$0.03 < d_4/f < 0.08 \qquad (6)$$

where f is the focal length of the overall system and $d_4$ is the air separation between said second and third lenses.

10. A bright triplet lens as claimed in claim 1 or 3, wherein the second lens is a negative meniscus lens.

11. A bright triplet lens according to claim 1 or 3, wherein the aspherical surface on said first lens is arranged on the surface of the objective side of the first lens.

12. A bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, and in which at least two of said first to third lenses are provided with aspherical surfaces, which satisfies the following conditions (2) and (5):

$$0.4 < f_1/f < 0.7 \qquad (2)$$

$$0.806 < r_5/f < 4 \qquad (5)$$

where f is the focal length of the overall system, $f_1$ is the focal length of said first lens, and $r_5$ is the radius of curvature on the incident side of said third lens.

13. A bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, at least two of said first to third lenses being provided with aspherical surfaces, and which conforms to the following conditions:

$$n_1 > 1.6, \; n_3 > 1.6 \qquad (7)$$

wherein $n_1$ and $n_3$ are the refractive indices of said first and third lenses, respectively, $$0.4 < f_1/f < 0.7 \qquad (2)$$

where f is the focal length of the overall system and $f_1$ is the focal length of said first lens, and $$0.806 < r_5/f < 4 \qquad (5)$$

where f is the focal length of the overall system and $r_5$ is the radius of curvature on the incident side of said third lens.

14. A bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, and in which at least said second and said third lenses are provided with aspherical surfaces, and which satisfies the following condition (5):

$$0.806 < r_5/f < 4 \qquad (5)$$

where f is the focal length of the overall system and $r_5$ is the radius of curvature on the incident side of said third lens.

15. A bright triplet as claimed in claim 14, which satisfies the following condition (8):

$$n_1 > 1.7, \; n_3 > 1.7 \qquad (8)$$

wherein $n_1$ and $n_3$ are the refractive indices of said first and third lenses, respectively.

16. A bright triplet which comprises, in order from the object side, a first lens consisting of a positive single lens of glass in a meniscus form convex on the object side, a second lens located with an air separation between it and said first lens and consisting of a negative single lens of glass, a third lens located with an air separation between it and said second lens and consisting of a positive single lens of glass in a double-convex form, and an aperture stop located on the image side of said third lens, at least said second and said third lenses being provided with aspherical surfaces, and which conforms to the following conditions:

$$n_1 > 1.6, \; n_3 > 1.6 \qquad (7)$$

wherein $n_1$ and $n_3$ are the refractive indices of said first and third lenses, respectively, and $$0.806 < r_5/f < 4 \qquad (5)$$

where f is the focal length of the overall system and $r_5$ is the radius of curvature on the incident side of said third lens.

17. A bright triplet as claimed in one of claims 12, 13, 14 or 16, which satisfies the following condition (1):

$$1 \times 10^{-4} < x/f < 1 \times 10^{-2} \qquad (1)$$

where x is the difference between the aspherical and spherical configurations at the effective maximum diameters of said aspherical surfaces, and f is the focal length of the overall system.

18. A bright triplet as claimed in one of claims 12, 13, 14 or 16, which satisfies the following condition (2):

$$0.4 < f_1/f < 0.7 \quad (2)$$

where f is the focal length of the overall system and $f_1$ is the focal length of said first lens.

19. A bright triplet as claimed in one of claims 12, 13, 14 or 16, which satisfies the following condition (3):

$$-0.5 < f_2/f < -0.3 \quad (3)$$

where f is the local length of the overall system and $f_2$ is the focal length of said second lens.

20. A bright triplet as claimed in one of claims 12, 13, 14 or 16, which satisfies the following condition (4):

$$0.4 < f_3/f < 0.85 \quad (4)$$

where f is the focal length of the overall system and $f_3$ is the focal length of said third lens.

21. A bright triplet as claimed in one of claims 12, 13, 14 or 16, which satisfies the following condition (6):

$$0.03 < d_4/f < 0.08 \quad (6)$$

where f is the focal length of the overall system and $d_4$ is the air separation between said second and third lenses.

22. A bright triplet lens as claimed in one of claims 12, 13, 14 or 16, wherein the second lens is a negative meniscus lens.

* * * * *